(12) United States Patent
Wang et al.

(10) Patent No.: US 7,801,547 B2
(45) Date of Patent: Sep. 21, 2010

(54) SYSTEM AND METHOD FOR DETERMINING DOWNLINK SIGNALING POWER IN A RADIO COMMUNICATION NETWORK

(75) Inventors: Yi-Pin Eric Wang, Cary, NC (US); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1151 days.

(21) Appl. No.: 11/275,309

(22) Filed: Dec. 22, 2005

(65) Prior Publication Data

US 2007/0149233 A1 Jun. 28, 2007

(51) Int. Cl.
*H04Q 7/20* (2006.01)

(52) U.S. Cl. .................. 455/522; 455/56; 455/66.1; 455/69; 455/76.1; 455/101; 455/115.3; 455/63.1; 455/504; 455/506

(58) Field of Classification Search ............. 455/56, 455/66.1, 76.1, 101, 115.3, 63.1, 504, 506
See application file for complete search history.

(56) References Cited

U.S. PATENT DOCUMENTS

| | | | | |
|---|---|---|---|---|
| 5,859,874 A * | 1/1999 | Wiedeman et al. | ....... | 375/267 |
| 6,256,476 B1 * | 7/2001 | Beamish et al. | ....... | 340/7.36 |
| 6,298,092 B1 * | 10/2001 | Heath et al. | ....... | 375/267 |
| 6,373,832 B1 * | 4/2002 | Huang et al. | ....... | 370/342 |
| 6,834,043 B1 * | 12/2004 | Vook et al. | ....... | 370/310 |
| 7,167,526 B2 * | 1/2007 | Liang et al. | ....... | 375/267 |
| RE40,056 E * | 2/2008 | Heath et al. | ....... | 375/267 |
| 7,373,168 B1 * | 5/2008 | Kumar | ....... | 455/522 |
| 7,477,678 B2 * | 1/2009 | Jeschke | ....... | 375/148 |
| 7,508,792 B2 * | 3/2009 | Petrovic et al. | ....... | 370/331 |
| 7,509,554 B2 * | 3/2009 | Lohr et al. | ....... | 714/748 |
| 7,653,409 B2 * | 1/2010 | Inaba | ....... | 455/522 |
| 7,684,372 B2 * | 3/2010 | Beale et al. | ....... | 370/334 |
| 2002/0097686 A1 * | 7/2002 | Qiu | ....... | 370/252 |
| 2003/0039217 A1 * | 2/2003 | Seo et al. | ....... | 370/318 |
| 2003/0072379 A1 * | 4/2003 | Ketchum | ....... | 375/260 |
| 2004/0235526 A1 * | 11/2004 | Kaipainen et al. | ....... | 455/561 |
| 2005/0037718 A1 * | 2/2005 | Kim et al. | ....... | 455/101 |
| 2005/0043051 A1 * | 2/2005 | Takano et al. | ....... | 455/522 |
| 2005/0111527 A1 * | 5/2005 | Jeschke | ....... | 375/147 |
| 2005/0250497 A1 * | 11/2005 | Ghosh et al. | ....... | 455/436 |
| 2005/0250506 A1 * | 11/2005 | Beale et al. | ....... | 455/452.1 |
| 2005/0260981 A1 * | 11/2005 | Todd | ....... | 455/420 |
| 2005/0265281 A1 * | 12/2005 | Ketchum | ....... | 370/328 |
| 2006/0014505 A1 * | 1/2006 | Hiraki | ....... | 455/132 |
| 2006/0019672 A1 * | 1/2006 | Kolding et al. | ....... | 455/452.2 |

(Continued)

*Primary Examiner*—Duc Nguyen
*Assistant Examiner*—Hai V Nguyen

(57) ABSTRACT

A system and method for determining a downlink transmit power level for a downlink signaling channel such as the E-DCH HARQ Indicator Channel (E-HICH) in a cellular radio communication network, wherein the transmit power level is calculated to achieve a desired signaling message error rate. The base station determines a diversity order of an uplink control channel from a mobile station, and sets the downlink E-HICH transmit power based on the desired signaling message error rate and the diversity order of the uplink control channel. Optionally, the base station may first determine whether the cell transmitting the E-HICH is the serving cell for the High-Speed Downlink Shared Channel (HS-DSCH). If so, the base station determines the downlink transmit power level for the downlink signaling channel as an offset from the reported Channel Quality Indicator (CQI) value.

21 Claims, 6 Drawing Sheets

U.S. PATENT DOCUMENTS

| | | | |
|---|---|---|---|
| 2006/0073797 A1* | 4/2006 | Kent et al. | 455/132 |
| 2006/0217142 A1* | 9/2006 | Inaba | 455/522 |
| 2006/0240831 A1* | 10/2006 | Toskala et al. | 455/436 |
| 2006/0293008 A1* | 12/2006 | Hiraki et al. | 455/226.4 |
| 2008/0002646 A1* | 1/2008 | Hannu et al. | 370/338 |
| 2008/0102873 A1* | 5/2008 | Kumar | 455/522 |
| 2008/0159184 A1* | 7/2008 | Niwano | 370/278 |
| 2008/0254819 A1* | 10/2008 | Niwano et al. | 455/522 |
| 2008/0298387 A1* | 12/2008 | Lohr et al. | 370/467 |
| 2009/0109912 A1* | 4/2009 | DiGirolamo et al. | 370/329 |
| 2009/0154403 A1* | 6/2009 | Niwano | 370/329 |
| 2009/0196246 A1* | 8/2009 | Goto et al. | 370/329 |
| 2009/0290630 A1* | 11/2009 | Pietraski et al. | 375/232 |

* cited by examiner

SYSTEM AND METHOD FOR DETERMINING DOWNLINK SIGNALING POWER IN A RADIO COMMUNICATION NETWORK

BACKGROUND

The present invention relates to radio communication systems. More particularly, and not by way of limitation, the present invention is directed to a method and apparatus for determining downlink signaling power from a base station/Node B to a mobile station operating in a cellular radio communication network.

Wideband CDMA (WCDMA) is emerging as the leading global third generation (3G) standard. Specifications are evolving with the introduction of enhancements in the WCDMA uplink that are now part of the Third Generation Partnership Project (3GPP) Release 6. The main requirements driving this evolution are reduced delays, improved uplink high-data-rate coverage, and higher capacity. To meet these requirements, the following enhancements have been introduced: a short 2 ms Transmission Time Interval (TTI) for data transmissions, fast scheduling, and fast Hybrid Automatic Transmission Request (HARQ). To support these enhancements, a new uplink transport channel has been introduced, the Enhanced Dedicated Channel (E-DCH), in which a set of separate channelization codes is utilized for the data and the associated control signaling. The number of channelization codes carrying the E-DCH and their spreading factors depend on the data rate being utilized. The Enhanced Dedicated Physical Control Channel (E-DPCCH), carrying information for HARQ and transport format, uses a new code. These channels are code-multiplexed with the Dedicated Physical Data Channels (DPDCH) and Dedicated Physical Control Channels (DPCCH) of previous releases that use a 10 ms TTI for circuit switched services such as speech.

HARQ is one of the key enablers for meeting the WCDMA objectives with fast retransmission and soft combining. To support uplink HARQ operations, Acknowledgment Channels (ACKCHs), also known as E-DCH HARQ Indicator Channels (E-HICHs) in WCDMA, are needed in the downlink for the base station to signal Ack (Acknowledgment) or Nack (Not Acknowledgment) messages.

In addition to HARQ, transmission rate control is used to adjust cell-wide uplink interference (also known as uplink noise rise) so that the target cell-wide quality of service, in terms of delays, throughput, and/or call blockage can be met. To achieve this, two additional downlink signaling channels are introduced in WCDMA, namely the E-DCH Absolute Grant Channel (E-AGCH) and the E-DCH Relative Grant Channel (E-RGCH). E-AGCH provides fast signaling to adjust the maximum allowable transmit data rate for scheduled users, whereas E-RGCH is a 1-bit (or three-level) message sent within a TTI to fine-tune the transmit data rate of an active user.

To maximize the benefits of HARQ and rate control, these downlink-signaling channels need to be received with high reliability. To achieve this, the E-HICH, E-AGCH, and E-RGCH must be sent with sufficient power. However, using excessive power to send E-HICH, E-AGCH, and E-RGCH results in lower available power for data and voice communications, which leads to lower data throughput or voice capacity in the downlink. Thus, it is important to have a good trade-off between downlink signaling reliability and power consumption.

In previously disclosed solutions for this problem, an E-DPDCH user is typically assigned an associated dedicated physical channel (DPCH) in both the uplink and the downlink. This DPCH is mainly used to keep the power control loop working. With power control (both inner and outer loops), the transmit power of the DPCH is appropriately determined so that the target performance of the DPCH can be met. Thus, a simple solution for determining the transmit power of the E-HICH, E-AGCH, and E-RGCH is to apply an offset to the transmit power of the DPCH. For example, if the power control mechanism has set the transmit power of DPCH as $P_{DPCH}$, and the nominal desired SINRs of the DPCH and the E-HICH are x and y, respectively, the transmit power of E-HICH ($P_{EHICH}$) can be determined by:

$$P_{EHICH} = (y/x) P_{DPCH}.$$

This scheme works well when the associated DPCH is not in the soft handoff (SHO) mode. During soft handoff, the power of the DPCH is decreased by a SHO gain. For signaling channels, however, SHO gain is not available because different active cells may send different downlink signaling messages. As a result, the transmit power of the E-HICH can be determined by:

$$P_{EHICH} = (zy/x) P_{DPCH},$$

where z accounts for the SHO gain of the DPCH. Since the Radio Network Controller (RNC) knows whether an associated DPCH is in soft handoff mode or not, the RNC can signal the power adjustment factor, y/x or zy/x to the Node Bs.

Another known way to determine the transmit power of the E-HICH is based on the Channel Quality Indicator (CQI) report, which indicates the received signal-to-interference-plus-noise ratio (SINR) of the High-Speed Downlink Shared Channel (HS-DSCH) for a nominal power allocation, $(E_c/I_{or})_{HSDSCH}$, where the factor $E_c/I_{or}$ is defined as the ratio of the transmit power utilized for a particular channel to the total transmit power of the base station. Expressed in another way:

$$(\gamma_{HSDSCH})_{dB} = CQI + \gamma_0,$$

where $(\gamma_{HSDSCH})_{dB}$ is the SINR of the HS-DSCH in dB, and $\gamma_0$ is the HS-DSCH SINR to which CQI=0 corresponds. If it is assumed that the CQI feedback indicates that received SINR for the HS-DSCH, when the base station allocates $(E_c/I_{or})_{HSDSCH}$ of power to transmit HS-DSCH, is $\gamma_{HSDSCH}$, and the target received SINR for E-HICH is $\gamma_{EHICH}$, then, the transmit power allocation needed to satisfy the target received SINR for E-HICH is:

$$(E_c/I_{or})_{EHICH} = (E_c/I_{or})_{HSDSCH}\left(\frac{\gamma_{EHICH}}{\gamma_{HSDSCH}}\right).$$

Converting the above equation to dB, $$(E_c/I_{or})_{EHICH,dB} = (E_c/I_{or})_{HSDSCH,dB} + (\gamma_{EHICH})_{dB} - (\gamma_{HSDSCH})_{dB} = (E_c/I_{or})_{HSDSCH,dB} + (\gamma_{EHICH})_{dB} - CQI - \gamma_0$$

The equation above can be used to compute the required power allocation factor of E-HICH. The transmit power for E-HICH is then:

$$(P_{EHICH})_{dB} = (P_{BS})_{dB} + (E_c/I_{or})_{EHICH,dB}$$

where $(P_{BS})_{dB}$ is the total base station power in dB. This works well when the cell that needs to send the E-HICH happens to be the serving cell for the HS-DSCH because in this case, CQI is readily available to the base station. The transmitted power of the E-AGCH and the E-RGCH can be determined in a similar fashion.

There are several problems with these known approaches, however. First, in practice, the downlink SHO gain of the DPCH is not known to the RNC. Thus, it is very difficult for the RNC to obtain a good estimate of z. As a result, performance of the E-HICH, the E-AGCH, and the E-RGCH is often not adequate in soft handoff mode, particularly for channels from non-scheduling cells. Second, for the CQI-based approach, the issue of determining the transmit power of the E-HICH, the E-AGCH, and the E-RGCH from the non-HS-DSCH serving cells is not addressed.

What is needed in the art is a solution for determining the transmit power of the E-HICH, the E-AGCH, and the E-RGCH that overcomes the shortcomings of the prior art. The present invention provides such a solution.

SUMMARY

In one aspect, the present invention is directed to a method of determining a transmit power level for a signaling channel from a first node to a second node operating in a cellular radio communication network, wherein the transmit power level is calculated to achieve a desired signaling message error rate. The method includes determining by the first node, a diversity order of a control channel from the second node to the first node; and setting the transmit power level for the signaling channel based on at least the desired signaling message error rate and the diversity order of the control channel. In one embodiment, the signaling channel is a downlink signaling channel from a base station to a mobile station, and the control channel is an uplink control channel from the mobile station to the base station. To achieve a desired signaling message error rate of one percent, for example, the downlink transmit power level may be set at a fraction of the total base station transmit power equal to approximately −26 dB when the diversity order of the uplink control channel is high, to approximately −23 dB when the diversity order of the uplink control channel is medium, and to approximately −20 dB when the diversity order of the uplink control channel is low.

In another aspect, the present invention is directed to a method of determining a downlink transmit power level for a downlink signaling channel from a base station to a mobile station operating in a cellular radio communication network, wherein the transmit power level is calculated to achieve a desired signaling message error rate. The method includes determining by the base station, whether the cell transmitting the downlink signaling channel is the serving cell for the High-Speed Downlink Shared Channel (HS-DSCH); and upon determining that the cell sending the downlink signals is the serving cell for the HS-DSCH, determining the downlink transmit power level for the downlink signaling channel as an offset from the reported CQI value. This offset can be calculated based on the nominal power of the HS-DSCH used for the CQI estimation and the difference between the target SINR of the E-HICH and the HS-DSCH SINR to which CQI=0 corresponds. However, if it is determined that the cell sending the downlink signals is not the serving cell for the HS-DSCH, the base station determines a diversity order of an uplink control channel from the mobile station to the base station, and sets the downlink transmit power level for the downlink signaling channel based on the desired signaling message error rate and the diversity order of the uplink control channel.

In yet another aspect, the present invention is directed to a system in a base station in a cellular radio communication network for determining a downlink transmit power level for a downlink signaling channel, wherein the transmit power level is calculated to achieve a desired signaling message error rate. The system includes means for determining a diversity order of an uplink control channel from the mobile station to the base station; and means for setting the downlink transmit power level based on the desired signaling message error rate and the diversity order of the uplink control channel. The means for determining the diversity order of the uplink control channel may include a path searcher for resolving a number of uplink signaling paths taken by the uplink signal, and a channel classifier for determining the diversity order based on the number of resolved uplink signaling paths.

The system may also include means for determining by the base station, whether the cell transmitting the downlink signaling channel is the serving cell for the HS-DSCH; and means responsive to a determination that the cell sending the downlink signals is the serving cell for the HS-DSCH, for determining the downlink transmit power level for the downlink signaling channel as an offset from the reported CQI value. Once again, this offset can be calculated based on the nominal power of the HS-DSCH used for the CQI estimation and the difference between the target SINR of the E-HICH and the HS-DSCH SINR to which CQI=0 corresponds. In this case, the downlink transmit power level is set based on the desired signaling message error rate and the diversity order of the uplink control channel only if the cell sending the downlink signals is not the serving cell for the HS-DSCH.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

The present invention uses information from the uplink channel to determine whether the channel is a low diversity order channel or a high diversity order channel, and sets the downlink transmit power accordingly. The uplink and downlink mostly likely share the same multi-path profile. Thus, based on information from the path searcher and/or channel estimator, the base station can determine whether a user has a high or low diversity order channel. The path searcher measures multipath delays and determines whether the signal is arriving at the base station via 1, 2, 3, or more resolvable paths, and thus whether the channel has a diversity order of 1, 2, 3, or more. For the exemplary embodiment described herein, a channel with a diversity order of 1 or 2 is defined as low; a diversity order of 3 is defined as medium; and a diversity order of 4 or more is defined as high diversity order.

Figure 1:
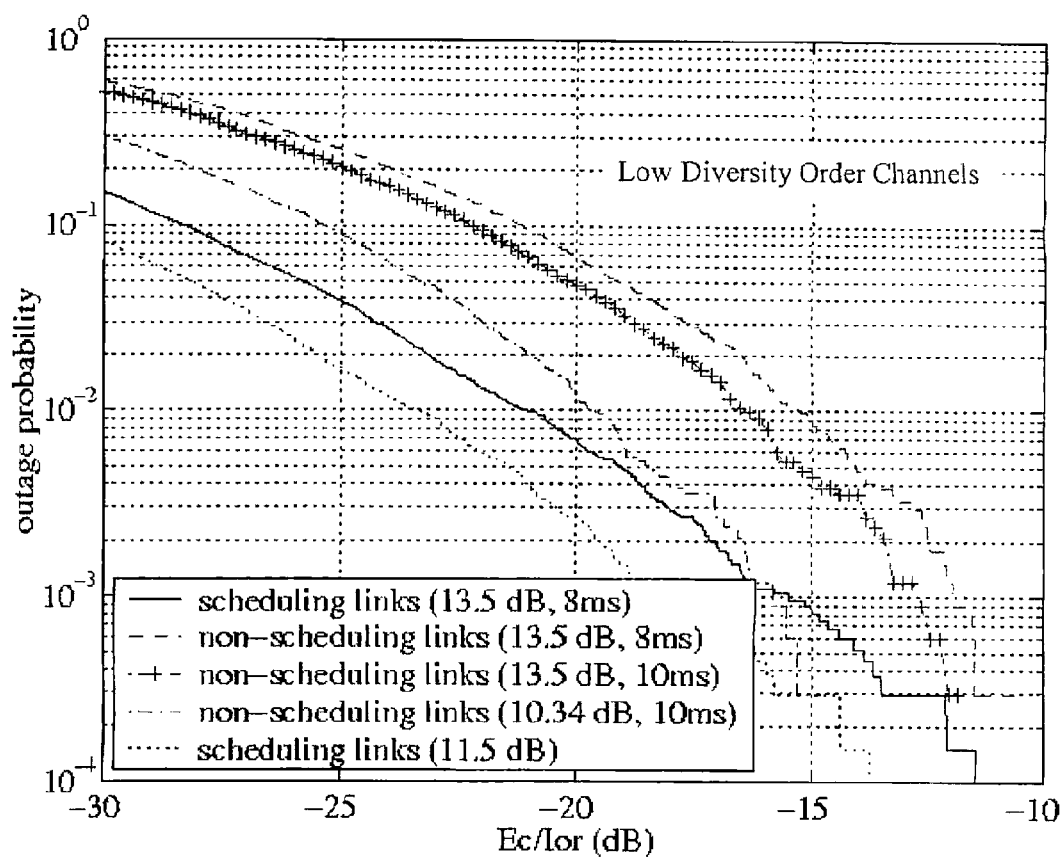
FIG. 1 is a graph of simulation results showing outage probability as a function of $E_c/I_{or}$, for the E-HICH and the E-RGCH for various operating scenarios for a low diversity channel.

In a first exemplary embodiment of the present invention, the E-HICH, E-AGCH, and E-RGCH are transmitted at a fixed power level. This fixed power level is determined so as to provide a desired reception quality for a worst-case user (usually the farthest from the base station). FIG. 1 is a graph of simulation results showing outage probability as a function of $E_c/I_{or}$ (power allocation factor) for the E-HICH and the E-RGCH for various operating scenarios for a low diversity channel. Here, outage probability is defined as the percentage of E-HICH/E-RGCH receptions having a message error rate higher than 1 percent. It can be seen from FIG. 1 that in low diversity channels, an $E_c/I_{or}$ of approximately −21 dB is needed to guarantee that approximately 99 percent of signaling from the scheduling cells achieves an E-HICH/E-RGCH message error rate less than 1 percent. If non-scheduling cells use $E_c/I_{or}$ =−21 dB to signal E-HICH/E-RGCH, the outage probabilities range from 2% to 10%, which are acceptable.

Figure 2:
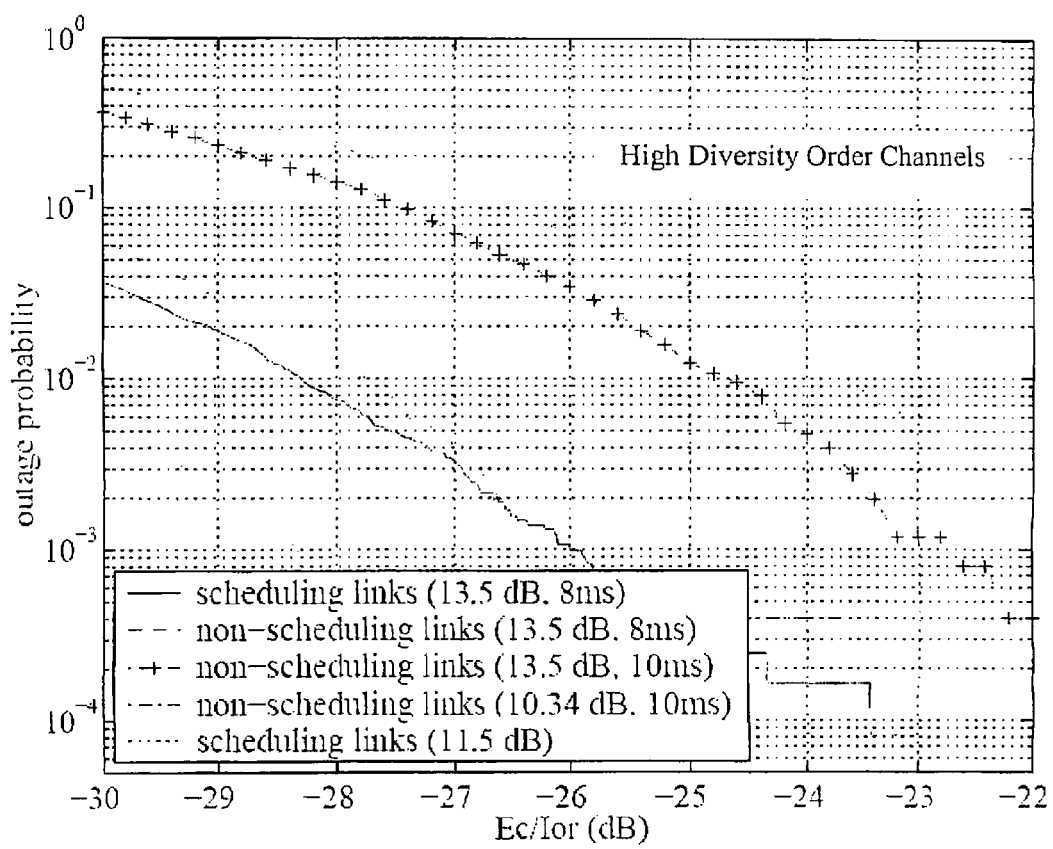
FIG. 2 is a graph of simulation results showing outage probability as a function of $E_c/I_{or}$ for the E-HICH and the E-RGCH for various operating scenarios for a high diversity channel.

FIG. 2 is a graph of outage probability as a function of $E_c/I_{or}$ for the E-HICH and the E-RGCH for various operating scenarios for a high diversity channel. Comparing FIGS. 1 and 2, signaling power required in high diversity channels is shown to be much less. In this case, with $E_c/I_{or}$ =−26.5 dB, the outage probabilities are lower than their counterparts in low diversity channels using $E_c/I_{or}$ =−21 dB.

Using the E-HICH as an example, the simulation results show that for a 10-ms TTI with 8-ms E-HICH message duration, the E-HICH needs to have $E_c/I_{or}$ of approximately −26 dB to guarantee that approximately 99 percent of the users in the cell have a probability of missed detection of the E-HICH of less than 1 percent in a high diversity order channel such as the 3GPP Typical Urban channel. If the channel has a medium diversity order, then $E_c/I_{or}$ =−23 dB is needed. If the channel is of a low diversity order (for example, the Pedestrian A channel defined in 3GPP), then $E_c/I_{or}$ =−20 dB is needed to guarantee that approximately 99 percent of the users in the cell have a probability of missed detection of the E-HICH of less than 1 percent. Note that with a low diversity order channel, a user is more likely to experience a deep fade, and thus a higher transmit power is needed to compensate for deep fades. In this way, the power level of the E-HICH is controlled according to the user's uplink multi-path profile.

The transmit power of the E-AGCH and E-RGCH are determined in a similar fashion.

Figure 3:
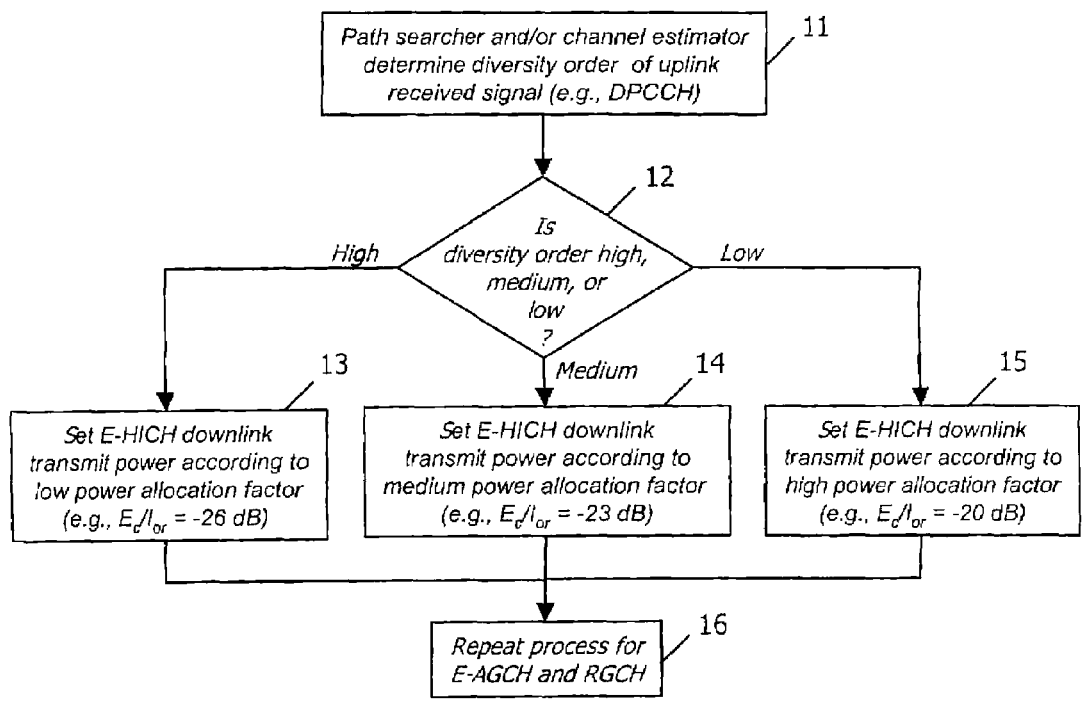
FIG. 3 is a flow diagram illustrating the steps of a first exemplary embodiment of the method of the present invention.

FIG. 3 is a flow diagram illustrating the steps of the first embodiment of the method of the present invention. Looking first at the uplink received signal (for example, the Dedicated Physical Control Channel (DPCCH)), at step 11, the path searcher and/or channel estimator in the base station determine the diversity order of the uplink received signal. At step 12, it is determined whether the diversity order is high, medium, or low. If the diversity order is high, the process moves to step 13 and sets the downlink transmit power for the E-HICH according to a low power allocation factor (for example, $E_c/I_{or}$ =−26 dB). If the diversity order is medium, the process moves to step 14 and sets the downlink transmit power for the E-HICH according to a medium power allocation factor (for example, $E_c/I_{or}$ =−23 dB). If the diversity order is low, the process moves to step 15 and sets the downlink transmit power for the E-HICH according to a high power allocation factor (for example, $E_c/I_{or}$ =−20 dB). The process is then repeated at step 16 for the E-AGCH and the E-RGCH.

Figure 4:
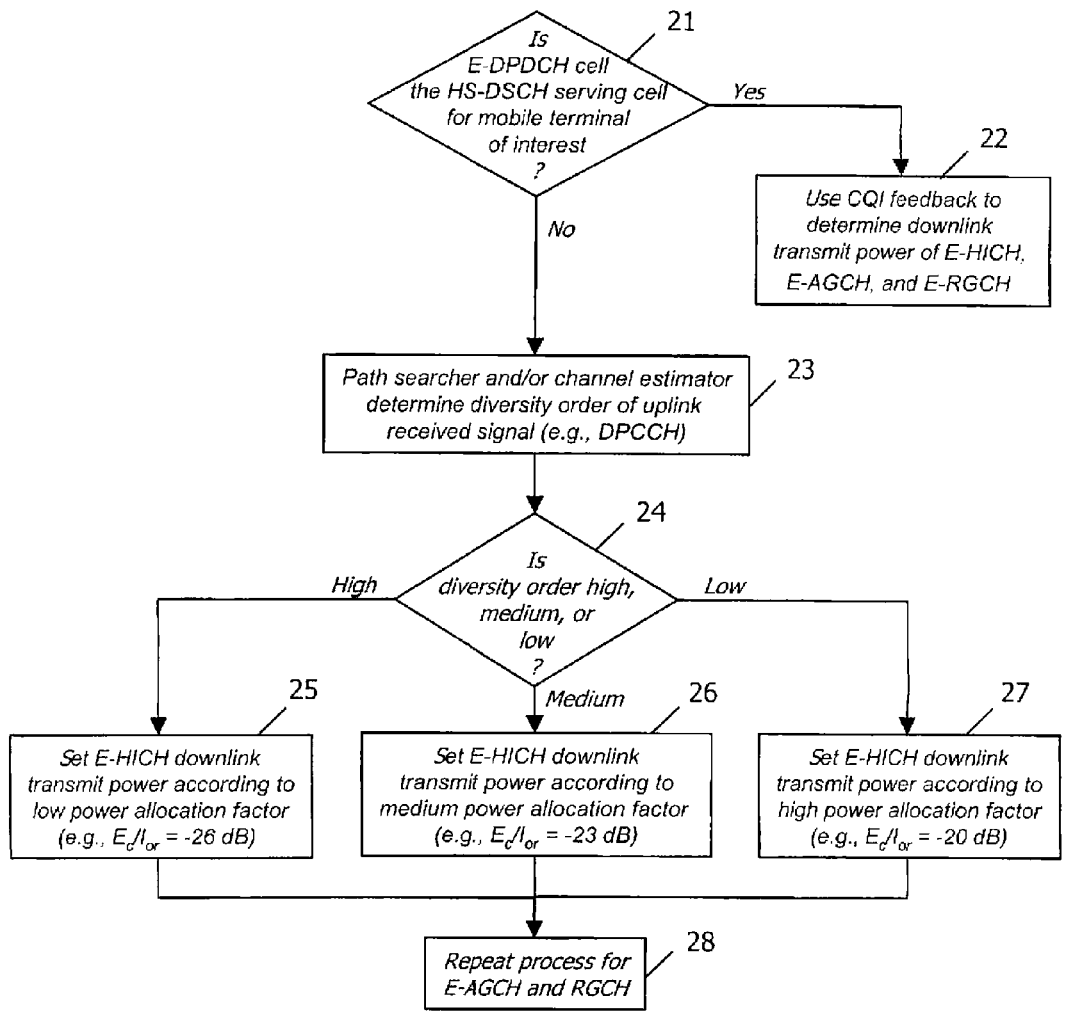
FIG. 4 is a flow diagram illustrating the steps of a second exemplary embodiment of the method of the present invention.

FIG. 4 is a flow diagram illustrating the steps of a second exemplary embodiment of the method of the present invention. This embodiment builds upon the CQI-based approach mentioned earlier. At step 21, it is determined whether the E-DPDCH receiving cell is the HS-DSCH serving cell for the mobile terminal of interest. If so, the process moves to step 22 where the CQI feedback is used to determine the transmit power of the E-HICH. If the E-DPDCH receiving cell is not the HS-DSCH serving cell, and thus the CQI feedback is not available for the mobile terminal of interest, the process determines the transmit power of the E-HICH according to the user's uplink multi-path profile, as described in the first embodiment. Thus, the process moves from step 21 to step 23 where the path searcher and/or channel estimator in the base station determine the diversity order of the uplink received signal. At step 24, it is determined whether the diversity order is high, medium, or low. If the diversity order is high, the process moves to step 25 and sets the downlink transmit power for the E-HICH according to a low power allocation factor (for example, $E_c/I_{or}$ =−26 dB). If the diversity order is medium, the process moves to step 26 and sets the downlink transmit power for the E-HICH according to a medium power allocation factor (for example, $E_c/I_{or}$ =−23 dB). If the diversity order is low, the process moves to step 27 and sets the downlink transmit power for the E-HICH according to a high power allocation factor (for example, $E_c/I_{or}$ =−20 dB). The process is then repeated at step 28 for the E-AGCH and the E-RGCH.

Once again, the transmit power of the E-AGCH and E-RGCH are determined in a similar fashion.

It should also be noted that the present invention may be implemented in such a manner that a greater number or lesser number of diversity orders are determined. For example, if only two diversity orders are determined, the path searcher and/or channel estimator in the base station may determine whether the diversity order of the uplink received signal is high or low. In this case, a diversity order of 1 or 2 may be defined as low while a diversity order of 3 or more is defined as high. If the diversity order is low, the downlink transmit power may be set to a high power allocation factor (for example, $E_c/I_{or}$ =−20 dB). If the diversity order is high, the downlink transmit power may be set to a low power allocation factor (for example, $E_c/I_{or}$ =−26 dB).

Figure 5:
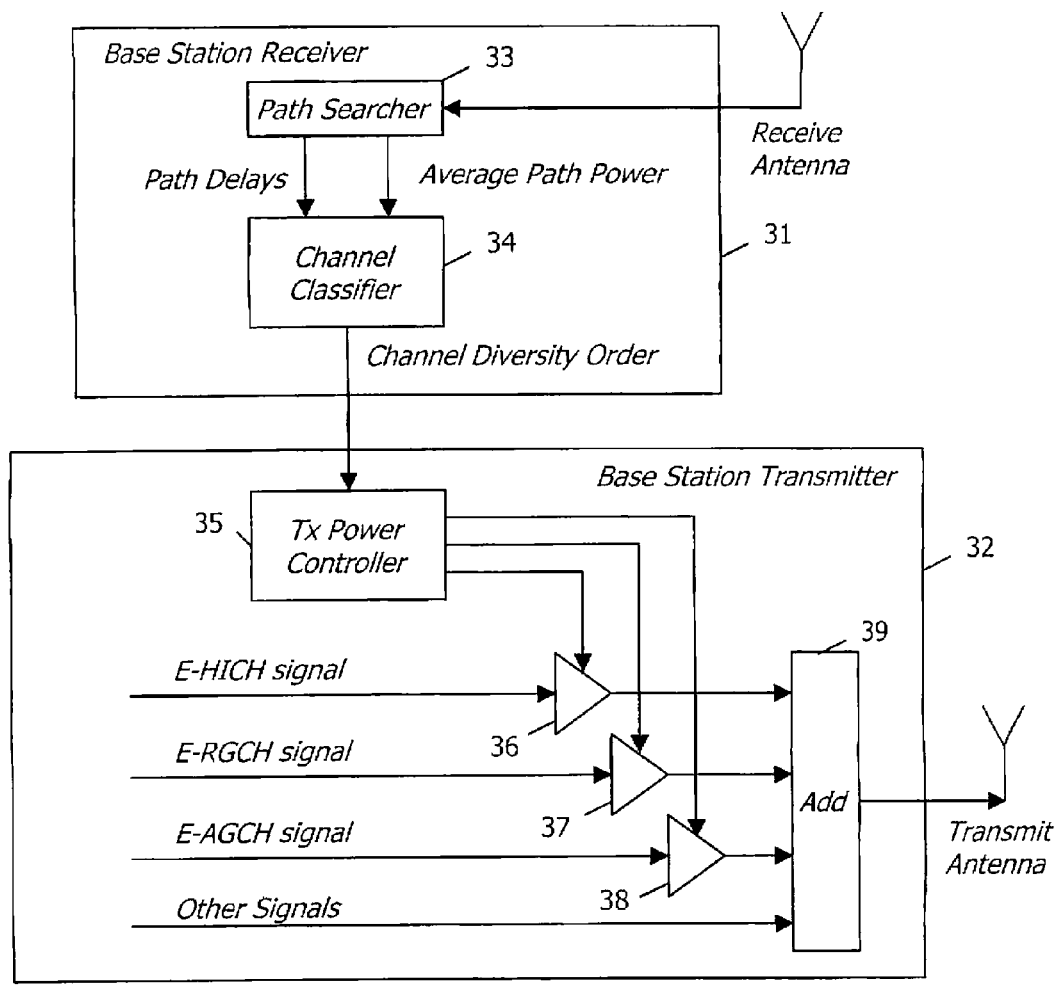
FIG. 5 is a simplified functional block diagram illustrating a first embodiment of the system of the present invention.

FIG. 5 is a simplified functional block diagram illustrating a first embodiment of the system of the present invention. The system includes a base station receiver 31 and a base station transmitter 32. The receiver includes a path searcher 33 and a channel classifier 34. The path searcher measures multipath delays and calculates an average path power. The delays and the average path power are sent to the channel classifier, which uses that information to determine the channel diversity order. The channel diversity order is sent to the base station transmitter for use in determining the proper transmit (Tx) power level for each channel.

The base station transmitter 32 includes a transmit power controller 35, power amplifiers 36-38, and an adder 39. The transmit power controller controls the power amplifiers based on the number and types of input signals, the desired outage probability for each type of signal, the channel diversity order, and the total transmit power of the base station.

Figure 6:
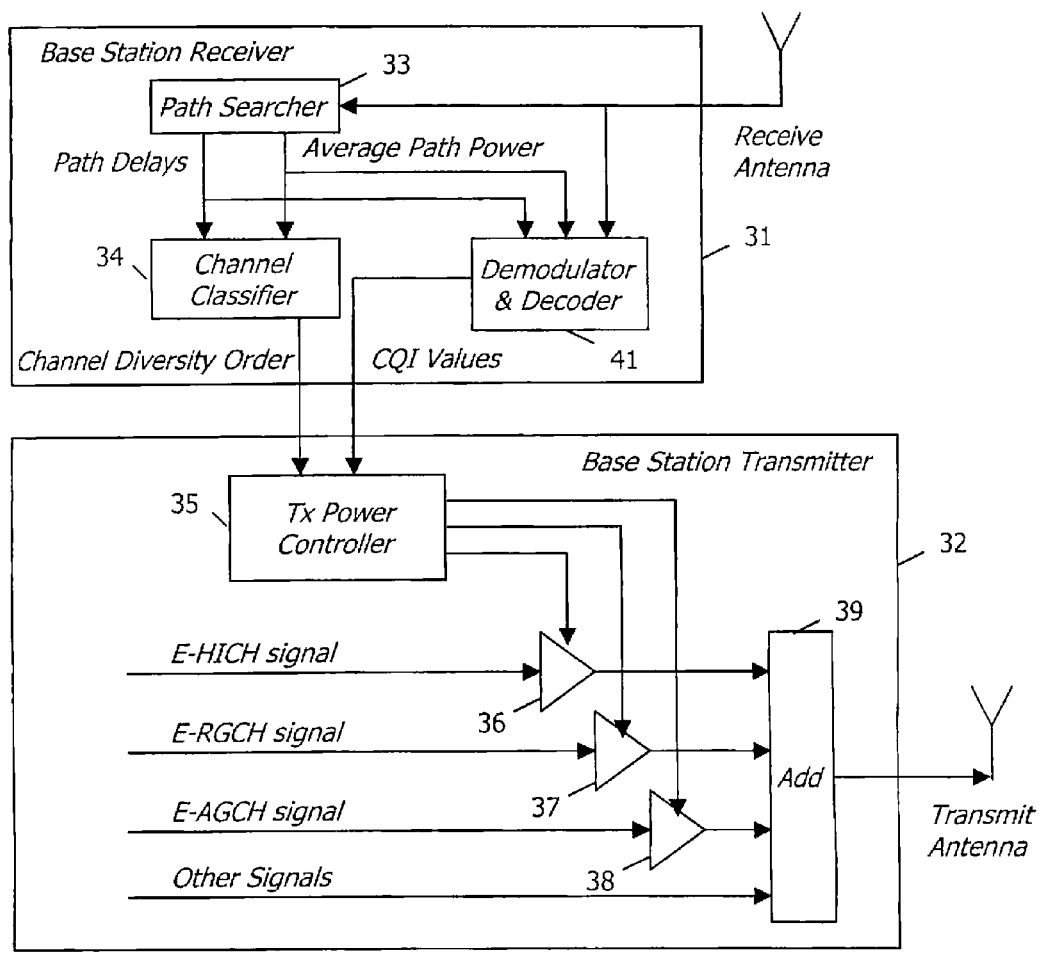
FIG. 6 is a simplified functional block diagram illustrating a second embodiment of the system of the present invention.

FIG. 6 is a simplified functional block diagram illustrating a second embodiment of the system of the present invention. In this embodiment, a demodulator and decoder 41 in the base station receiver 31 determines CQI values from the received signal as well as the multipath delays and the average path power received from the path searcher 33. The CQI values are supplied to the transmit power controller 35 together with the channel diversity order. If the E-DPDCH cell is the HS-DSCH serving cell for the mobile terminal of interest, the CQI values are used to determine the transmit power of the E-HICH as discussed above. If the E-DPDCH cell is not the HS-DSCH serving cell for the mobile terminal of interest, the transmit power controller controls the power amplifiers 36-38 based on the number and types of input signals, the desired outage probability for each type of signal, the channel diversity order, and the total transmit power of the base station, as described in the first embodiment of the present invention.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of determining a transmit power level for a signaling channel from a first node to a second node operating in a cellular radio communication network, wherein the transmit power level is calculated to achieve a desired signaling message error rate, said method comprising:
   determining by the first node, the number of resolvable multipath signaling paths taken by a signal sent on a control channel from the second node to the first node; and
   setting the transmit power level for the signaling channel based on at least the desired signaling message error rate and the number of multipath signaling paths of the control channel.

2. The method according to claim 1, wherein the first node is a mobile station and the second node is a base station, the signaling channel is an uplink signaling channel, and the control channel is a downlink control channel.

3. The method according to claim 1, wherein the first node is a base station and the second node is a mobile station, the signaling channel is a downlink signaling channel, and the control channel is an uplink control channel.

4. The method according to claim 3, wherein the step of resolving the number of uplink multipath signaling paths includes measuring by a path searcher in the base station, any multipath delays in the uplink signal.

5. The method according to claim 3, wherein the step of setting the downlink transmit power level includes setting the downlink transmit power level at a low power allocation factor when the number of multipath signaling paths of the uplink control channel is high, at a medium power allocation factor when the number of multipath signaling paths of the uplink control channel is medium, and at a high power allocation factor when the number of multipath signaling paths of the uplink control channel is low.

6. The method according to claim 5, wherein the number of multipath signaling paths is determined to be high when there are at least four uplink multipath signaling paths, the number of multipath signaling paths is determined to be medium when there are three uplink multipath signaling paths, and the number of multipath signaling paths is determined to be low when there are one or two uplink multipath signaling paths.

7. The method according to claim 5, wherein a low allocation factor is equal to approximately −26 dB, a medium allocation factor is equal to approximately −23 dB, and a high allocation factor is equal to approximately −20 dB.

8. The method according to claim 3, wherein the step of setting the downlink transmit power level includes setting the downlink transmit power level at a low power allocation factor when the number of multipath signaling paths of the uplink control channel is high, and at a high power allocation factor when the number of multipath signaling paths of the uplink control channel is low.

9. The method according to claim 8, wherein the number of multipath signaling paths is determined to be high when there are at least three uplink multipath signaling paths, and the number of multipath signaling paths is determined to be low when there are one or two uplink multipath signaling paths.

10. The method according to claim 8, wherein a low allocation factor is equal to approximately −26 dB, and a high allocation factor is equal to approximately −20 dB.

11. A method of determining a downlink transmit power level for a downlink signaling channel from a base station to a mobile station operating in a cellular radio communication network, wherein the transmit power level is calculated to achieve a desired signaling message error rate, said method comprising:
   determining by the base station, whether the cell transmitting the downlink signaling channel is the serving cell for the High-Speed Downlink Shared Channel (HS-DSCH);
   upon determining that the cell sending the downlink signals is the serving cell for the HS-DSCH, determining the downlink transmit power level for the downlink signaling channel as an offset from the reported Channel Quality Indicator (CQI) value; and
   upon determining that the cell sending the downlink signals is not the serving cell for the HS-DSCH:
   determining by the base station, the number of resolvable multipath signaling paths taken by a signal sent on an uplink control channel from the mobile station to the base station; and
   setting the downlink transmit power level for the downlink signaling channel based on the desired signaling message error rate and the number of multipath signaling paths of the uplink control channel.

12. The method according to claim 11, wherein the step of determining the downlink transmit power level for the downlink signaling channel as an offset from the reported CQI value includes calculating the offset based on the nominal power of the HS-DSCH used for the CQI estimation and the difference between the target signal-to-interference-plus-noise ratio (SINR) of the E-HICH and the HS-DSCH SINR to which CQI=0 corresponds.

13. In a base station in a cellular radio communication network, a system for determining a downlink transmit power level for a downlink signaling channel, wherein the transmit power level is calculated to achieve a desired signaling message error rate, said system comprising:
   means for determining
   the number of resolvable multipath signaling paths taken by a signal sent on an uplink control channel from the mobile station to the base station; and
   means for setting the downlink transmit power level based on the desired signaling message error rate and the number of multipath signaling paths of the uplink control channel.

14. The system according to claim 13, wherein the means for setting the downlink transmit power level includes a transmit power controller adapted to set the downlink transmit power level at a low power allocation factor when the number of multipath signaling paths of the uplink control channel is high, at a medium power allocation factor when the number of multipath signaling paths of the uplink control channel is medium, and at a high power allocation factor when the number of multipath signaling paths of the uplink control channel is low.

15. The system according to claim 14, wherein a the number of multipath signaling paths is determined to be high when there are at least four uplink multipath signaling paths, the number of multipath signaling paths is determined to be medium when there are three uplink multipath signaling paths, and the number of multipath signaling paths is determined to be low when there are one or two uplink multipath signaling paths.

16. The system according to claim 14, wherein a low allocation factor is equal to approximately −26 dB, a medium allocation factor is equal to approximately −23 dB, and a high allocation factor is equal to approximately −20 dB.

17. The system according to claim 13, wherein the means for setting the downlink transmit power level is adapted to set the downlink transmit power level at a low power allocation factor when the number of multipath signaling paths of the uplink control channel is high, and at a high power allocation factor when the number of multipath signaling paths of the uplink control channel is low.

18. The system according to claim 17, wherein the number of multipath signaling paths is determined to be high when there are at least three uplink multipath signaling paths, and the number of multipath signaling paths is determined to be low when there are one or two uplink multipath signaling paths.

19. The system according to claim 17, wherein a low allocation factor is equal to approximately −26 dB, and a high allocation factor is equal to approximately −20 dB.

20. The system according to claim 13, further comprising:
means for determining by the base station, whether the cell transmitting the downlink signaling channel is the serving cell for the High-Speed Downlink Shared Channel (HS-DSCH); and
means responsive to a determination that the cell sending the downlink signals is the serving cell for the HS-DSCH, for determining the downlink transmit power level for the downlink signaling channel as an offset from the reported Channel Quality Indicator (CQI) value;
wherein the downlink transmit power level is set based on the desired signaling message error rate and the number of multipath signaling paths of the uplink control channel only if the cell sending the downlink signals is not the serving cell for the HS-DSCH.

21. The system according to claim 20, wherein the means for determining the downlink transmit power level for the downlink signaling channel as an offset from the reported CQI value includes means for calculating the offset based on the nominal power of the HS-DSCH used for the CQI estimation and the difference between the target signal-to-interference-plus-noise ratio (SINR) of the E-HICH and the HS-DSCH SINR to which CQI=0 corresponds.

* * * * *

UNITED STATES PATENT AND TRADEMARK OFFICE
CERTIFICATE OF CORRECTION

| | | |
|---|---|---|
| PATENT NO. | : 7,801,547 B2 | |
| APPLICATION NO. | : 11/275309 | |
| DATED | : September 21, 2010 | |
| INVENTOR(S) | : Wang et al. | |

It is certified that error appears in the above-identified patent and that said Letters Patent is hereby corrected as shown below:

In Column 8, Lines 49-54, in Claim 13, delete "the number of resolvable......................channel." and insert the same at Line 47, after "means for determining", as a continuation of the Paragraph.

In Column 8, Line 65, in Claim 15, delete "a the" and insert -- the --, therefor.

Signed and Sealed this
Eleventh Day of January, 2011

David J. Kappos
*Director of the United States Patent and Trademark Office*